US009575670B1

(12) United States Patent
Guo

(10) Patent No.: US 9,575,670 B1
(45) Date of Patent: Feb. 21, 2017

(54) SYSTEMS AND METHODS FOR DYNAMIC LOAD BALANCING ON DISKS

(71) Applicant: Symantec Corporation, Mountain View, CA (US)

(72) Inventor: Fanglu Guo, Los Angeles, CA (US)

(73) Assignee: Veritas Technologies, Mountain View, CA (US)

( * ) Notice: Subject to any disclaimer, the term of this patent is extended or adjusted under 35 U.S.C. 154(b) by 122 days.

(21) Appl. No.: 14/584,549

(22) Filed: Dec. 29, 2014

(51) Int. Cl.
*G06F 12/00* (2006.01)
*G06F 3/06* (2006.01)

(52) U.S. Cl.
CPC .......... *G06F 3/0613* (2013.01); *G06F 3/0665* (2013.01); *G06F 3/0689* (2013.01)

(58) Field of Classification Search
CPC ..... G06F 3/0613; G06F 3/0689; G06F 3/0665
See application file for complete search history.

(56) References Cited

U.S. PATENT DOCUMENTS

| 2002/0091746 A1* | 7/2002 | Umberger | G06F 3/0613 718/105 |
| 2010/0049934 A1* | 2/2010 | Tomita | G06F 3/0613 711/165 |

OTHER PUBLICATIONS

Gulati, Ajay et al., "Basil: Automated IO Load Balancing Across Storage Devices", https://www.usenix.org/legacy/event/fast10/tech/full_papers/gulati.pdf, as accessed Nov. 17, 2014, FAST'10 Proceedings of the 8th USENIX Conference on File and Storage Technologies, USENIX Association Berkeley, CA, (2010), pp. 13-13.
"Subset sum problem", http://en.wikipedia.org/wiki/Subset_sum_problem, as accessed Nov. 17, 2014, Wikipedia, (Jan. 24, 2004).

* cited by examiner

*Primary Examiner* — Kalpit Parikh
(74) *Attorney, Agent, or Firm* — Fisherbroyles LLP

(57) ABSTRACT

The disclosed computer-implemented method for dynamic load balancing on disks may include (1) calculating the spare throughput for each disk, (2) identifying a lightly loaded disk and a heavily loaded disk, (3) identifying a set of workloads to be transferred from the heavily loaded disk to the lightly loaded disk by: (a) beginning with the set empty, (b) identifying candidate workloads on the heavily loaded disk, (c) adding a new workload from the candidate workloads to the set when the new workload would not reduce the spare throughput on the lightly loaded disk below a threshold if both the set and the workload were transferred to the lightly loaded disk, and (d) considering each workload for transfer in order from most throughput consumed to least throughput consumed, and (4) transferring the set of workloads. Various other methods, systems, and computer-readable media are also disclosed.

20 Claims, 7 Drawing Sheets

SYSTEMS AND METHODS FOR DYNAMIC LOAD BALANCING ON DISKS

BACKGROUND

In the information age, organizations and individuals generate and store large amounts of data. One popular way of storing this data is on scalable storage systems consisting of nodes and disks. Additional nodes and disks can be added to the system to provide more storage capacity and/or to improve storage response times. In many systems, additional disks may be added and allocated with minimal manual configuration. However, traditional load balancing techniques may suffer from a variety of drawbacks. Static load mappings that keep each client with the same disk until the client is finished suffer from numerous inefficiencies by failing to account for slow clients, extra overhead imposed by other tasks, and similar concerns.

Some systems use dynamic load balancing techniques in an attempt to keep loads evenly distributed across disks. However, traditional dynamic load balancing techniques also suffer from flaws. Some traditional systems may overcorrect for imbalances, causing perpetual oscillations between heavily and lightly loaded disks as workloads are repeatedly transferred back and forth. Other traditional systems may fail to account for factors such as differently sized disks and as a result may not efficiently balance workloads between disks. Accordingly, the instant disclosure identifies and addresses a need for additional and improved systems and methods for dynamic load balancing on disks.

SUMMARY

As will be described in greater detail below, the instant disclosure describes various systems and methods for dynamic load balancing on disks by calculating spare throughput on each disk and then transferring workloads from heavily loaded disks to lightly loaded disks only as long as the lightly loaded disks have higher than average spare throughput and the average spare throughput on the system is not decreasing.

In one example, a computer-implemented method for dynamic load balancing on disks may include (1) calculating, for each disk in a disks, a spare throughput by calculating a difference between the maximum throughput of the disk and a throughput currently consumed at least in part by workloads from one or more client systems, (2) identifying a lightly loaded disk with a highest spare throughput among the disks and a heavily loaded disk with a lowest spare throughput among the disks, (3) identifying a set of workloads to be transferred from the heavily loaded disk to the lightly loaded disk by: (a) beginning with the set of workloads empty, (b) identifying a set of candidate workloads initiated by the client systems on the heavily loaded disk, (c) adding a new workload from the set of candidate workloads to the set of workloads to be transferred when the new workload would not reduce the spare throughput on the lightly loaded disk below a predetermined threshold for spare throughput on transfer recipients if both the set of workloads and the workload were transferred to the lightly loaded disk, where the predetermined threshold is calculated based on an average spare throughput for the disks, and (d) considering each workload in the set of candidate workloads for inclusion into the set of workloads to be transferred in order from most throughput consumed to least throughput consumed, and (4) transferring the set of workloads from the heavily loaded disk to the lightly loaded disk.

Workload transfers may be initiated in a number of ways. In one embodiment, calculating, for each disk in the disks, the spare throughput may include determining that the average spare throughput for the disks is not decreasing and a workload transfer is therefore to be initiated. In some examples, identifying the lightly loaded disk may include determining that a difference between the average spare throughput and the spare throughput on the lightly loaded disk surpasses a predetermined threshold for imbalanced disk throughput and a workload transfer is therefore to be initiated. Additionally or alternatively, identifying the heavily loaded disk may include determining that the spare throughput on the heavily loaded disk is below a predefined threshold for minimum spare throughput on heavily loaded disks and a workload transfer is therefore to be initiated.

In some examples, calculating the difference between the maximum throughput of the disk and the throughput currently consumed may include calculating the throughput currently consumed based on a percentage of time the disk is active rather than idle. In some embodiments, idle disks may use a manually inputted value for maximum throughput for calculations.

In one embodiment, the computer-implemented method may further include (1) identifying a new heavily loaded disk with a new lowest spare throughput among the disks after the set of workloads has been transferred from the heavily loaded disk, (2) identifying a set of workloads to be transferred from the new heavily loaded disk to the lightly loaded disk, (3) transferring the set of workloads from the new heavily loaded disk to the lightly loaded disk, and (4) continuing to identify new heavily loaded disks with new lowest spare throughputs and transfer workloads from the new heavily loaded disks to the lightly loaded disk until the spare throughput for the lightly loaded disk would drop below the predetermined threshold for spare throughput if an additional workload were transferred to the lightly loaded disk. In some examples, transferring the set of workloads from the heavily loaded disk to the lightly loaded disk may include initiating the transfer of the set of workloads after identifying the entirety of the set of workloads to be transferred.

In some examples, considering each workload in the set of candidate workloads may include ceasing considering workloads once the set of workloads to be transferred would put the spare throughput of the lightly loaded disk within a predetermined tolerance of the predetermined threshold for spare throughput. In one embodiment, the predetermined threshold may include the average spare throughput across the disks.

In one embodiment, a system for implementing the above-described method may include (1) a calculation module, stored in memory, that calculates, for each disk in a disks, a spare throughput by calculating a difference between the maximum throughput of the disk and a throughput currently consumed at least in part by workloads from one or more client systems, (2) a disk identification module, stored in memory, that identifies a lightly loaded disk with a highest spare throughput among the disks and a heavily loaded disk with a lowest spare throughput among the disks, (3) a workload identification module, stored in memory, that identifies a set of workloads to be transferred from the heavily loaded disk to the lightly loaded disk by: (a) beginning with the set of workloads empty, (b) identifying a set of candidate workloads initiated by the client systems on the heavily loaded disk, (c) adding a new workload from the set of candidate workloads to the set of workloads to be transferred when the new workload would not reduce the spare throughput on the lightly loaded disk below a predetermined threshold for spare throughput on transfer recipients if both the set of workloads and the workload were transferred to the lightly loaded disk, where the predetermined threshold is calculated based on an average spare throughput for the disks, and (d) considering each workload in the set of candidate workloads for inclusion into the set of workloads to be transferred in order from most throughput consumed to least throughput consumed, (4) a transfer module, stored in memory, that transfers the set of workloads from the heavily loaded disk to the lightly loaded disk, and (5) at least one physical processor configured to execute the calculation module, the disk identification module, the workload identification module, and the transfer module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) calculate, for each disk in a disks, a spare throughput by calculating a difference between the maximum throughput of the disk and a throughput currently consumed at least in part by workloads from one or more client systems, (2) identify a lightly loaded disk with a highest spare throughput among the disks and a heavily loaded disk with a lowest spare throughput among the disks, (3) identify a set of workloads to be transferred from the heavily loaded disk to the lightly loaded disk by: (a) beginning with the set of workloads empty, (b) identifying a set of candidate workloads initiated by the client systems on the heavily loaded disk, (c) adding a new workload from the set of candidate workloads to the set of workloads to be transferred when the new workload would not reduce the spare throughput on the lightly loaded disk below a predetermined threshold for spare throughput on transfer recipients if both the set of workloads and the workload were transferred to the lightly loaded disk, where the predetermined threshold is calculated based on an average spare throughput for the disks, and (d) considering each workload in the set of candidate workloads for inclusion into the set of workloads to be transferred in order from most throughput consumed to least throughput consumed, and (4) transfer the set of workloads from the heavily loaded disk to the lightly loaded disk.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
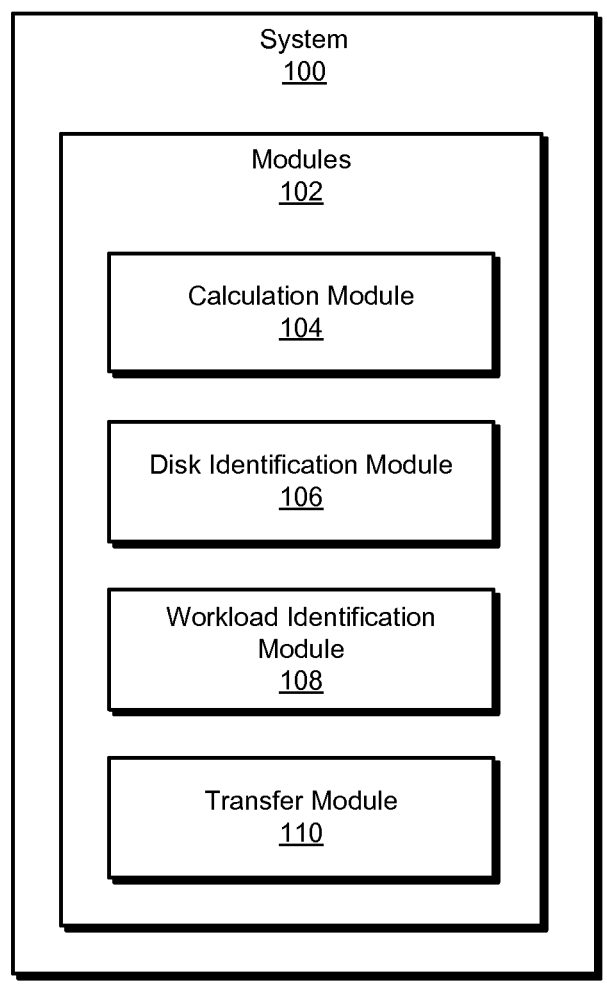
FIG. 1 is a block diagram of an exemplary system for dynamic load balancing on disks.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for dynamic load balancing on disks. As will be explained in greater detail below, by transferring workloads between disks only when certain conditions are met and considering workloads in order from largest to smallest, the systems described herein may increase the efficiency of storage disk systems without expending a large amount of resources. In addition, by identifying workloads to be transferred to a lightly loaded disk only until the throughput of the lightly loaded disk below a threshold, the systems described herein may avoid consuming extra resources by repeatedly switching workloads to and from the same disks.

The following will provide, with reference to FIGS. 1, 2, 4, and 5, detailed descriptions of exemplary systems for dynamic load balancing on disks. Detailed descriptions of corresponding computer-implemented methods will also be provided in connection with FIG. 3. In addition, detailed descriptions of an exemplary computing system and network architecture capable of implementing one or more of the embodiments described herein will be provided in connection with FIGS. 6 and 7, respectively.

FIG. 1 is a block diagram of exemplary system 100 for dynamic load balancing on disks. As illustrated in this figure, exemplary system 100 may include one or more modules 102 for performing one or more tasks. For example, and as will be explained in greater detail below, exemplary system 100 may include a calculation module 104 that may calculate, for each disk in a group of disks, a spare throughput by calculating a difference between the maximum throughput of the disk and a throughput currently consumed at least in part by workloads from one or more client systems. Exemplary system 100 may additionally include a disk identification module 106 that may identify a lightly loaded disk with a highest spare throughput among the group of disks and a heavily loaded disk with a lowest spare throughput among the group of disks.

Exemplary system 100 may also include a workload identification module 108 that may identify a set of workloads to be transferred from the heavily loaded disk to the lightly loaded disk by: (a) beginning with the set of workloads empty, (b) identifying a set of candidate workloads initiated by the client systems on the heavily loaded disk, (c) adding a new workload from the set of candidate workloads to the set of workloads to be transferred when the new workload would not reduce the spare throughput on the lightly loaded disk below a predetermined threshold for spare throughput on transfer recipients if both the set of workloads and the workload were transferred to the lightly loaded disk, where the predetermined threshold may be calculated based on an average spare throughput for the group of disks, and (d) considering each workload in the set of candidate workloads for inclusion into the set of workloads to be transferred in order from most throughput consumed to least throughput consumed. Exemplary system 100 may additionally include a transfer module 110 that may transfer the set of workloads from the heavily loaded disk to the lightly loaded disk. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as computing device 202 illustrated in FIG. 2, computing system 610 in FIG. 6, and/or portions of exemplary network architecture 700 in FIG. 7. One or more of modules 102 in FIG. 1 may also represent all or portions of one or more special-purpose computers configured to perform one or more tasks.

Figure 2:
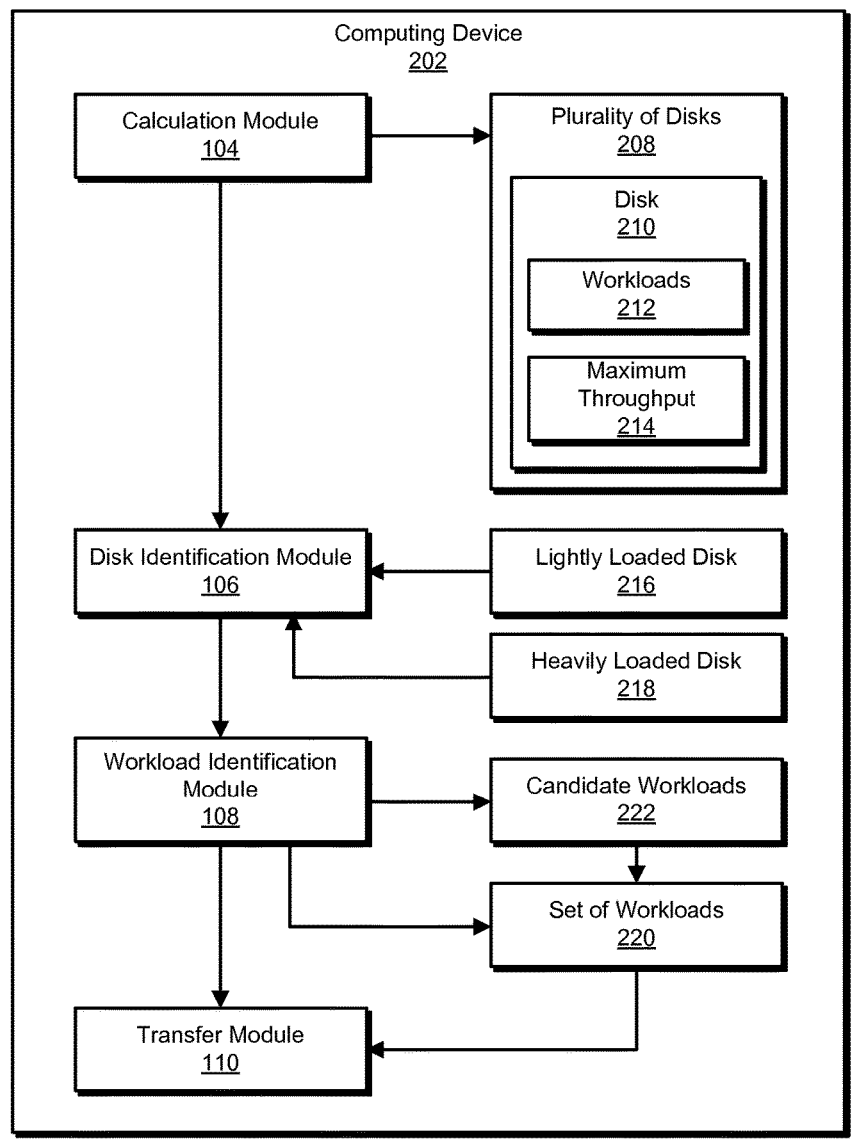
FIG. 2 is a block diagram of an additional exemplary system for dynamic load balancing on disks.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202. In one example, computing device 202 may be programmed with one or more of modules 102.

In one embodiment, one or more of modules 102 from FIG. 1 may, when executed by at least one processor of computing device 202, enable computing device 202 to perform dynamic load balancing on disks. For example, and as will be described in greater detail below, calculation module 104 may calculate, for each disk in a group of disks 208 (including, e.g., a disk 210), a spare throughput by calculating the difference between a maximum throughput 214 of disk 210 and the throughput currently consumed at least in part by workloads 212 from one or more client systems. Immediately or at some later time, disk identification module 106 may identify a lightly loaded disk 216 with a highest spare throughput among disks 208 and a heavily loaded disk 218 with a lowest spare throughput among disks 208. Next, workload identification module 108 may identify a set of workloads 220 to be transferred from heavily loaded disk 218 to lightly loaded disk 216 by: (a) beginning with set of workloads 220 empty, (b) identifying a set of candidate workloads 222 initiated by the client systems on heavily loaded disk 218, (c) adding a new workload from candidate workloads 222 to set of workloads 220 when the new workload would not reduce the spare throughput on lightly loaded disk 216 below a predetermined threshold for spare throughput on transfer recipients if both set of workloads 220 and the workload were transferred to lightly loaded disk 216, where the predetermined threshold is calculated based on an average spare throughput for disks 208, and (d) considering each workload in candidate workloads 222 for inclusion into set of workloads 220 in order from most throughput consumed to least throughput consumed. Finally, transfer module 110 may transfer set of workloads 220 from heavily loaded disk 218 to lightly loaded disk 216.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 610 in FIG. 6, or any other suitable computing device.

Figure 3:
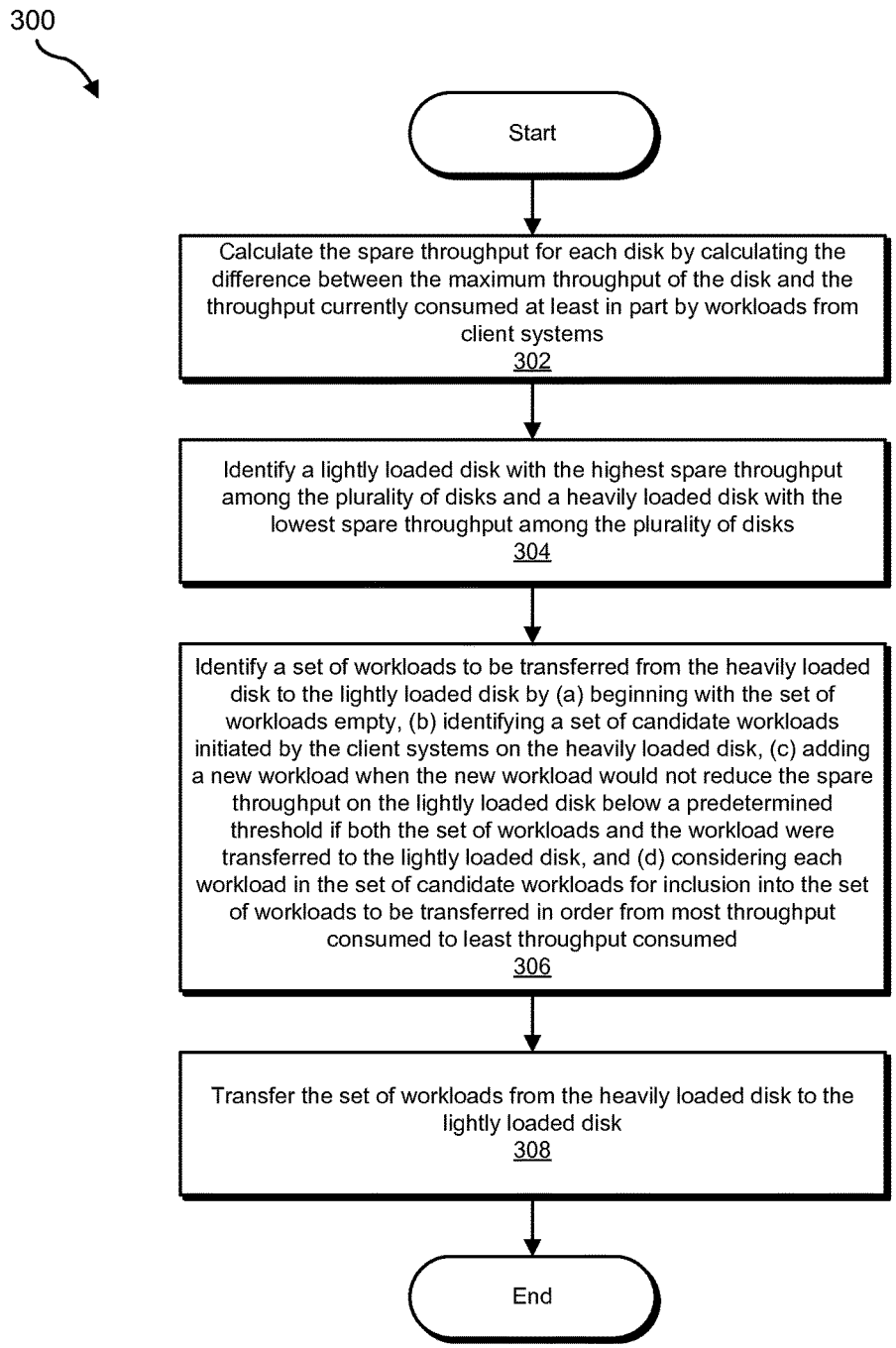
FIG. 3 is a flow diagram of an exemplary method for dynamic load balancing on disks.

FIG. 3 is a flow diagram of an exemplary computer-implemented method 300 for dynamic load balancing on disks. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated in FIG. 3, at step 302, one or more of the systems described herein may calculate, for each disk in a group of disks, a spare throughput by calculating a difference between the maximum throughput of the disk and a throughput currently consumed at least in part by workloads from one or more client systems. For example, calculation module 104 may, as part of computing device 202 in FIG. 2, calculate, for each disk 210 in disks 208, a spare throughput by calculating a difference between maximum throughput 214 of disk 210 and a throughput currently consumed at least in part by workloads 212 from one or more client systems.

The term "disk," as used herein, generally refers to any medium used to store data. In some embodiments, a disk may include a physical disk. Examples of disks include, without limitation, optical disks, magnetic disks, compact discs, analog disks, and/or any other suitable storage media.

The term "client system," as used herein, generally refers to any system that may store data on a disk and/or access data stored on a disk. In some embodiments, client systems may initiate workloads on disks.

The term "workload," as used herein, generally refers to any task that consumes resources on a disk. In some examples, a workload may be initiated by a client system. For example, a workload may include storing backup data to a disk. In other examples, a workload may include a non-client-initiated task such as copy management. In some embodiments, requests from a single client system may, in aggregate, constitute a single workload. In these embodiments, the terms "workload" and "client" may be used interchangeably when referring to load balancing decisions. In other embodiments, requests from a client system may be divided into multiple workloads.

The term "throughput," as used herein, generally refers to any measurement of data transfer to or from a disk. In some embodiments, throughput may refer to the scale of input/output (I/O) operations the disk is capable of or is currently handling. In some embodiment, throughput may be measured in megabytes per second (MB/s) of data transfer.

Calculation module 104 may calculate the spare throughput in a variety of ways. For example, calculation module 104 may calculate the throughput currently consumed based on a percentage of time the disk is active rather than idle and/or may calculate the spare throughput by subtracting the currently consumed throughput from the maximum throughput. In one embodiment, calculation module 104 may calculate spare throughput using the formula "spare throughput=(1−current disk utilization)/current disk utilization*current throughput," where current disk utilization ranges from zero for an idle disk to one for a fully utilized disk.

In some examples, disks may be manually tagged with a maximum throughput rating to be used as the spare throughput result when the disk is idle and a ratio of spare throughput cannot be calculated. Additionally or alternatively, calculation module 104 may use a disk's previous maximum throughput as the disk's spare throughput when the disk is idle. When the disk is not idle, calculation module 106 may calculate the disk's maximum throughput as a ratio of the current throughput to the current utilization. For example, if the disk's current throughput is 10 MB/s and the disk is idle 90% of the time (e.g., utilized 10% of the time), calculation module 104 may calculate that the disk's maximum throughput is 100 MB/s.

In some examples, a disk's maximum throughput may vary over time. For example, a disk that is currently processing a large number of small workloads may have a lower maximum throughput than a disk that is currently processing a smaller number of larger workloads. In another example, a disk that is processing less predictable workloads may have a smaller maximum throughput than a disk processing more predictable workloads.

In one embodiment, calculation module 104 may calculate, for each disk in the group of disks, the spare throughput by determining that the average spare throughput for the group of disks is not decreasing and a workload transfer is therefore to be initiated. In some examples, average spare throughput for a group of disks may increase if disks are becoming more balanced. In these examples, a workload transfer may be an unnecessary use of resources and thus better avoided. Maintaining balanced throughput across all the disks in the system may be important for accommodating bursts of demand without risking bottlenecks and/or slowdowns.

At step 304, one or more of the systems described herein may identify a lightly loaded disk with the highest spare throughput among the group of disks and a heavily loaded disk with the lowest spare throughput among the group of disks. For example, disk identification module 106 may, as part of computing device 202 in FIG. 2, identify lightly loaded disk 216 with a highest spare throughput among disks 208 and heavily loaded disk 218 with a lowest spare throughput among disks 208.

Disk identification module 106 may identify the lightly loaded disk and the heavily loaded disk in a variety of ways. For example, disk identification module 106 may keep track of the spare throughput on all disks in order to identify heavily loaded and lightly loaded disks. In some embodiments, disk identification module 106 may identify more than one heavily loaded disk at a time. For example, disk identification module 106 may identify any disk with spare throughput below a certain threshold as a heavily loaded disk.

In some examples, disk identification module 106 may identify the heavily loaded disk by determining that the spare throughput on the heavily loaded disk is below a predefined threshold for minimum spare throughput on heavily loaded disks and a workload transfer is therefore to be initiated. For example, a disk may not be considered a heavily loaded disk unless the spare throughput on the disk is below 10 MB/s. In this example, if no disks have a spare throughput of below 10 MB/s then a workload transfer may not be initiated, saving the resources that would be consumed by the workload transfer.

In some examples, disk identification module 106 may identify the lightly loaded disk by determining that a difference between the average spare throughput and the spare throughput on the lightly loaded disk surpasses a predetermined threshold for imbalanced disk throughput and a workload transfer is therefore to be initiated. In one example, a predetermined threshold for imbalanced disk throughput may be that a disk must have at least 20 MB/s more spare throughput than the average across all disks to be considered a lightly loaded disk. In this example, if the average spare throughput is 15 MB/s and no disk has a spare throughput of 35 MB/s or greater then calculation module 104 may not designate any disks as lightly loaded disks and no workload transfer may be initiated.

Figure 4:
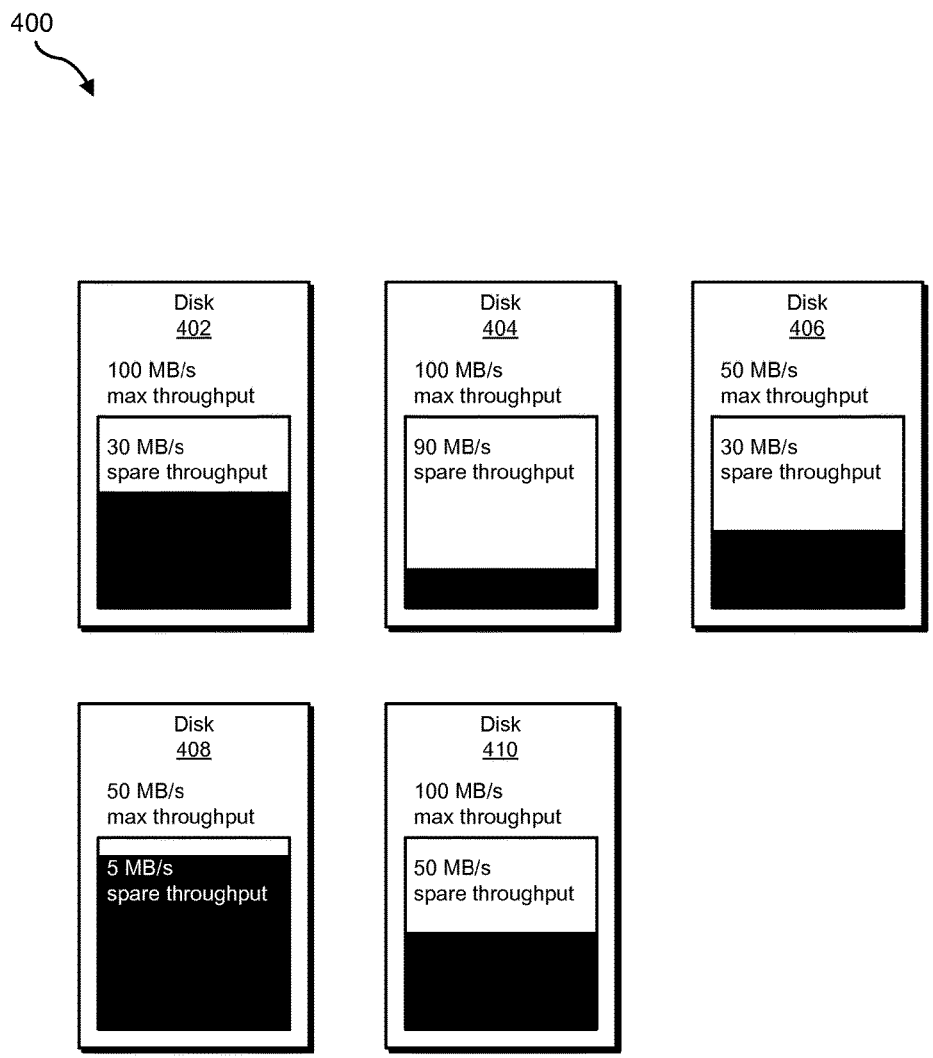
FIG. 4 is a block diagram of an exemplary computing system for dynamic load balancing on disks.

In some examples, disk identification module 106 may identify a group of disks with varying maximum throughputs and loads. FIG. 4 is a block diagram of an exemplary group of disks 400. As illustrated in FIG. 4, disk 402 may have a maximum throughput of 100 MB/s and a current spare throughput of 30 MB/s. Disk 404 may have a maximum throughput of 100 MB/s and a current spare throughput of 90 MB/s, disk 406 may have a maximum throughput of 50 MB/s and a current spare throughput of 30 MB/s, disk 408 may have a maximum throughput of 50 MB/s and a current spare throughput of 5 MB/s, and/or disk 410 may have a maximum throughput of 50 MB/s and a current spare throughput of 30 MB/s. In this example, two disks may have the same spare throughput but a different maximum throughput, such as disks 402 and 406. However, because the systems described herein may make decisions based on spare throughput (instead of, e.g., current throughput levels), disk identification module 106 may consider disks 402 and 406 as equal candidates for lightly loaded disks.

As illustrated in FIG. 4, the disks in system 400 have an average spare throughput of 41 MB/s. In this example, disk 404 is the most lightly loaded disk with a spare throughput of 90 MB/s. In some embodiments, disk identification module 106 may also identify disk 410 as a lightly loaded disk with a spare throughput of 50 MB/s that is above the average of 41 MB/s. In some examples, disk identification module 106 may identify disk 408 as the most heavily loaded disk because disk 408 has only 5 MB/s of spare throughput, even though the currently consumed throughput on disk 408 of 45 MB/s is less than the currently consumed throughput of 60 MB/s on disk 402.

Returning to FIG. 3, at step 306, one or more of the systems described herein may identify a set of workloads to be transferred from the heavily loaded disk to the lightly loaded disk by: (a) beginning with the set of workloads empty, (b) identifying a set of candidate workloads initiated by the client systems on the heavily loaded disk, (c) adding a new workload from the set of candidate workloads to the set of workloads to be transferred when the new workload would not reduce the spare throughput on the lightly loaded disk below a predetermined threshold for spare throughput on transfer recipients if both the set of workloads and the workload were transferred to the lightly loaded disk, where the predetermined threshold is calculated based on an average spare throughput for the group of disks, and (d) considering each workload in the set of candidate workloads for inclusion into the set of workloads to be transferred in order from most throughput consumed to least throughput consumed.

For example, workload identification module 108 may, as part of computing device 202 in FIG. 2, identify set of workloads 220 to be transferred from heavily loaded disk 218 to lightly loaded disk 216 by: (a) beginning with set of workloads 220 empty, (b) identifying candidate workloads 222 initiated by the client systems on heavily loaded disk 218, (c) adding a new workload from candidate workloads 222 to set of workloads 220 when the new workload would not reduce the spare throughput on lightly loaded disk 216 below a predetermined threshold for spare throughput on transfer recipients if both set of workloads 220 and the workload were transferred to lightly loaded disk 216, where the predetermined threshold is calculated based on an average spare throughput for disks 208, and (d) considering each workload in candidate workloads 222 for inclusion into set of workloads 220 in order from most throughput consumed to least throughput consumed.

Workload identification module 108 may consider workloads for inclusion into a set of workloads to be transferred in a variety of ways. For example, workload identification module 108 may consider workloads from several different heavily loaded disks for inclusion into the set of workloads to be transferred. In other embodiments, workload identification module 108 may consider workloads on only one heavily loaded disk at a time. For example, workload identification module 108 may identify only workloads on the most heavily loaded disk for transfer. In another example, workload identification module 108 may identify the largest workloads on all heavily loaded disks across the system.

In some examples, disk identification module 108 may consider each workload in the set of candidate workloads by ceasing considering workloads once the set of workloads to be transferred would put the spare throughput of the lightly loaded disk within a predetermined tolerance of the predetermined threshold for spare throughput. In one embodiment, the predetermined threshold may include the average spare throughput across the group of disks. For example, disk identification module 108 may cease considering candidate workloads if transferring the current set of identified workloads would put the lightly loaded disk below 20 MB/s above the average spare throughput across disks. In other embodiments, the predetermined threshold may be higher or lower than the average spare throughput. For example, the predetermined threshold may be 50 MB/s below the average spare throughput. Additionally or alternatively, in some embodiments, the predetermined tolerance may be zero MB/s above or below the predetermined threshold.

Figure 5:
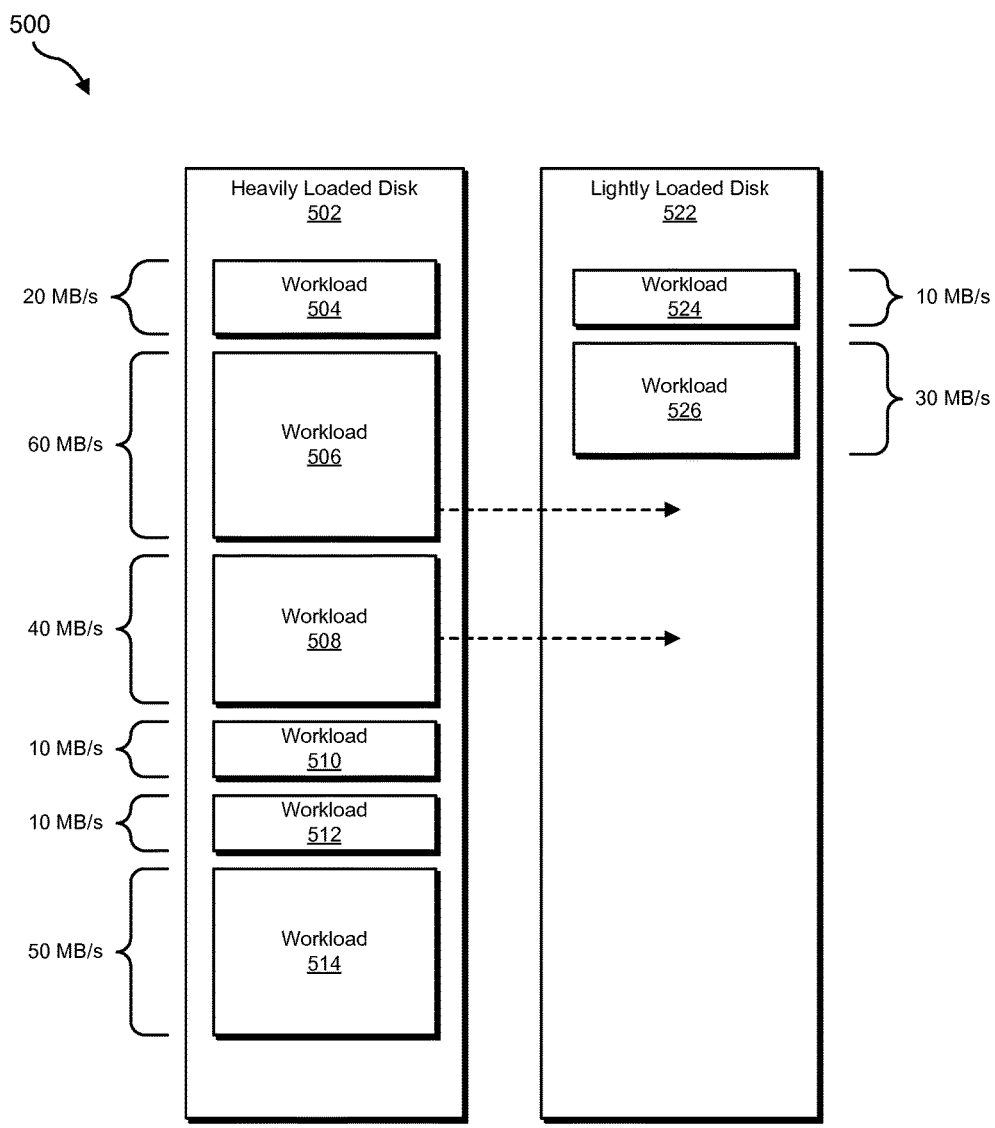
FIG. 5 is a block diagram of an exemplary computing system for dynamic load balancing on disks.

In some examples, the workloads identified for transfer to the lightly loaded disk may not be the largest workloads on the heavily loaded disk. As illustrated in FIG. 5, system 500 may have an average spare throughput of 60 MB/s and/or may include disk 502 and/or disk 522. Disk 502 may be a heavily loaded disk that may include workloads 504, 506, 508, 510, 512 and/or 514 that may consume various amounts of throughput. Disk 522 may be a lightly loaded disk that may include workloads 524 and/or 526. In this example, disk 502 may have a maximum throughput of 200 MB/s and a spare throughput of 10 MB/s and/or disk 522 may have a maximum throughput of 200 MB/s and a spare throughput of 160 MB/s.

Workload identification module 108 may consider the workloads on disk 502 in the order of workload 506, 514, 508, 504, 510 and then 512. In this example, if workload 506 were transferred to disk 522, disk 522 would still have a spare throughput of 100 MB/s, well above the average spare throughput of 60 MB/s. Workload identification module 108 may therefore add workload 506 to the set of workloads to be transferred to disk 522. If workload 514 and the set of identified workloads (i.e., workload 506) were to be transferred to disk 522, that would put disk 522's spare throughput at 50 MB/s, below the average spare throughput of 60 MB/s. Therefore, workload identification module 108 may not add workload 514 to the set of workloads to be transferred.

If workload 508 and the set of identified workloads were to be transferred to disk 522, workload identification module 108 may calculate the spare throughput of disk 522 spare throughput at 60 MB/s, exactly the average for the system. Therefore, in some embodiments, workload identification module 108 may add workload 508 to the set of workloads to be transferred. Because any further workloads would put disk 522's spare throughput below the average for the system, in some embodiments identification module 108 may cease considering workloads for potential transfer to disk 522.

In some embodiments, workload identification module 108 may not add workload 508 to the set of workloads because workload identification module 108 may only add workloads that do not reduce the lightly loaded disk's spare throughput below a predetermined tolerance, such as 15 MB/s, of the average spare throughput. In these embodiments, workload identification module 108 may instead add workload 504 to the set of workloads to be transferred to disk 522, because transferring workload 506 and workload 504 to disk 522 would only lower disk 522's spare throughput to 80 MB/s, which is more than 15 MB/s above the average spare throughput of 60 MB/s. In some embodiments, workload identification module 108 may continue considering workloads on disk 502 for transfer to other lightly loaded disks after disk 522 may no longer accept new workloads.

Returning to FIG. 3, at step 308, one or more of the systems described herein may transfer the set of workloads from the heavily loaded disk to the lightly loaded disk. For example, transfer module 110 may, as part of computing device 202 in FIG. 2, transfer set of workloads 220 from heavily loaded disk 218 to lightly loaded disk 216.

Transfer module 110 may transfer the workloads in a variety of contexts. For example, transfer module 110 may transfer a set of workloads from multiple heavily loaded disks to one lightly loaded disk. In another example, transfer module 110 may transfer workloads from one heavily loaded disk to one lightly loaded disk. In some examples, transfer module 110 may wait until all of the workloads that are eligible for transfer to a particular lightly loaded disk have been identified across any number of heavily loaded disks before transferring any workloads.

In some examples, disk identification module 106 may identifying a new heavily loaded disk with a new lowest spare throughput among the group of disks after the set of workloads has been transferred from the heavily loaded disk and workload identification module 108 identifying a set of workloads to be transferred from the new heavily loaded disk to the lightly loaded disk. In these examples, transfer module 110 may transfer the set of workloads from the new heavily loaded disk to the lightly loaded disk. Then the systems described herein may continuing to identify new heavily loaded disks with new lowest spare throughputs and transfer workloads from the new heavily loaded disks to the lightly loaded disk until the spare throughput for the lightly loaded disk would drop below the predetermined threshold for spare throughput if an additional workload were transferred to the lightly loaded disk. For example, returning to FIG. 4, the systems described herein may transfer workloads from disk 408 to disk 404 and then transfer workloads from the new most heavily loaded disk, disk 402 to disk 404 until the average throughput on disk 404 would drop below the average spare throughput on system 400. In some embodiments, the systems described herein may identify workloads for transfer on both disks 408 and 402 before transferring any workloads to disk 404.

As explained in connection with method 300 above, the systems described herein may improve of the efficiency of a group of storage disks by reducing bottlenecks and/or hot spots. In some embodiments, the storage disks may be part of a backup system. The systems described herein more effectively handle disks of different sizes and/or types by measuring load on disks in terms of spare throughput rather than disk utilization. The systems described herein may also avoid consuming extra resources by constantly rebalancing disks by only rebalancing disks if certain conditions are met, including average spare throughput staying stable or increasing, lightly loaded disks having significantly higher spare throughput than average, and/or heavily loaded disks having significantly less spare throughput than average. If a disk rebalancing is triggered, the systems described herein may identify a lightly loaded disk and at least heavily loaded disk, then consider workloads for transfer from the heavily loaded disk to the lightly loaded disk in order of size. By using a greedy bin packing algorithm to select workloads for transfer from heavily loaded disks to lightly loaded disks the systems described herein may also avoid expending excess resources in calculating the precise most efficient way to rebalance disks.

The systems described herein may achieve maximum throughput across the entire system by balancing workloads across disks, preventing any disks from becoming too overloaded. In addition, the systems described herein may allow a set of disks to better accommodate bursts of requests from client systems by maintaining balanced workloads across the system, reducing the chances of hot spots forming and leading to slowdowns in the event of a burst. The systems described herein may only identify workloads for transfer to the lightly loaded disk until the identified workloads would drop the lightly loaded disk's spare throughput below average for the system, avoiding potential problems with oscillation as lightly loaded disks become heavily loaded and vice versa. By transferring workloads only to avoid bottlenecks and not to achieve perfect balance, the systems described herein may improve the efficiency of storage disk systems without consuming a large amount of resources.

Figure 6:
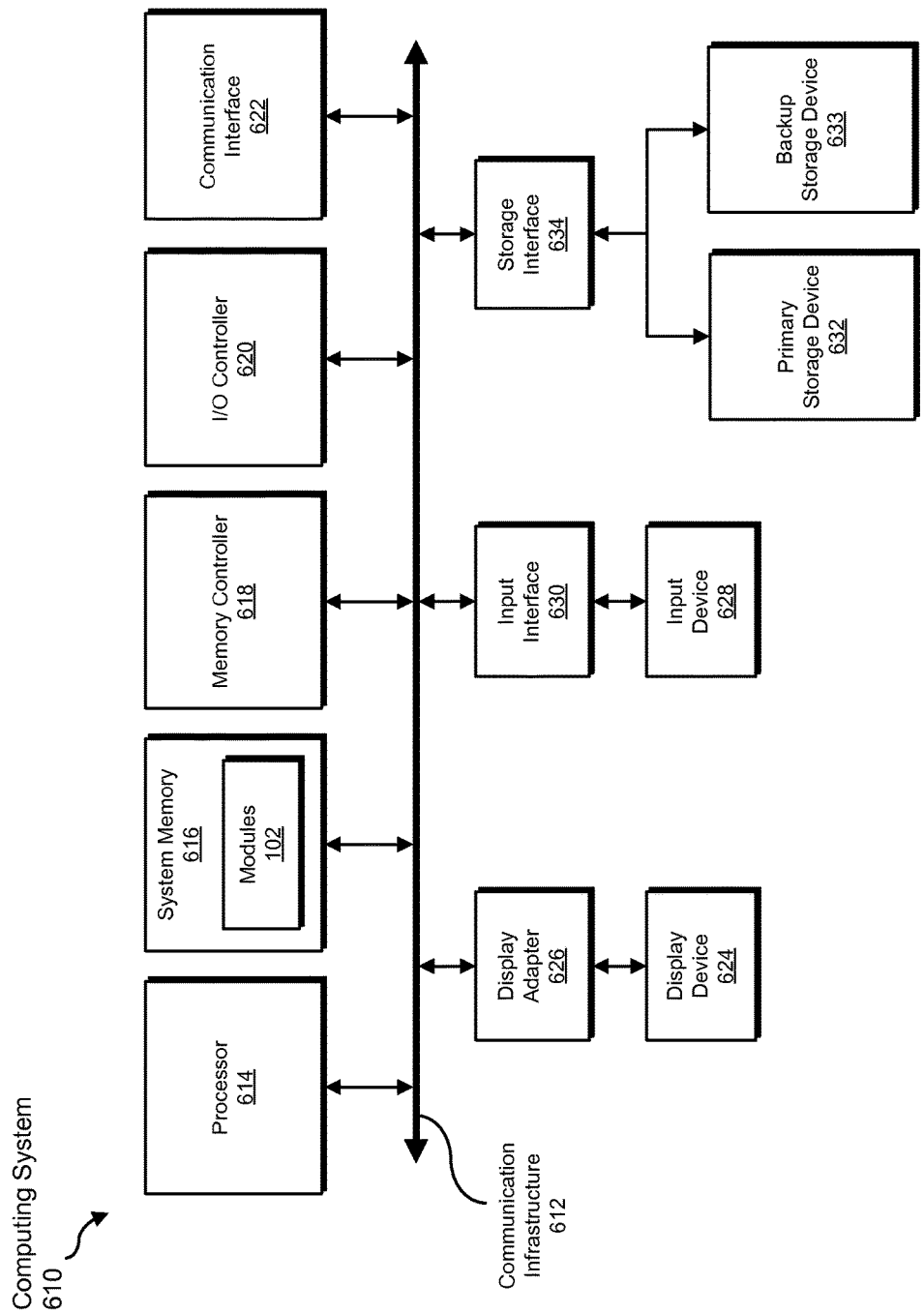
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an I/O controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an Application Specific Integrated Circuit (ASIC) adapted to implement one or more of the exemplary embodiments disclosed herein.

Figure 7:
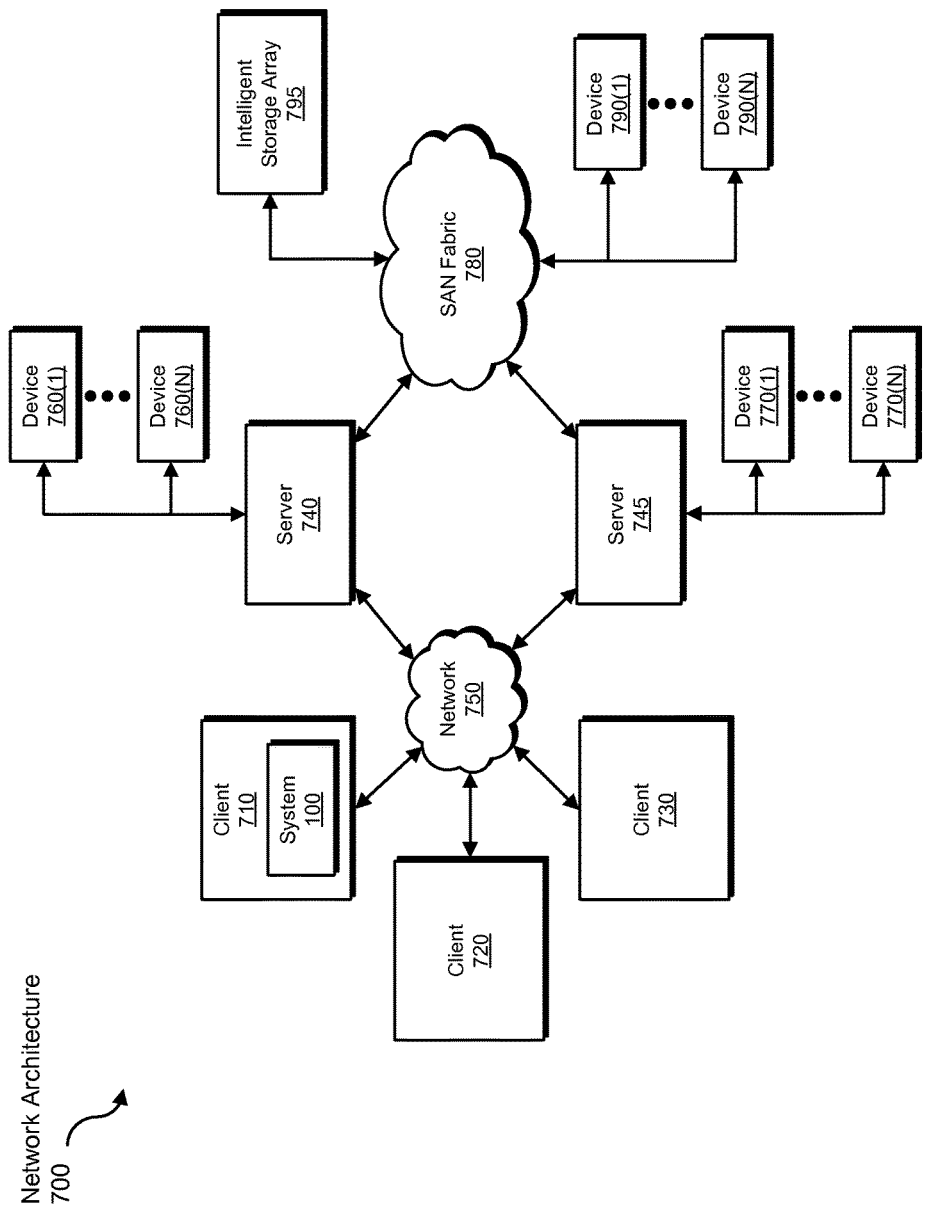
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for dynamic load balancing on disks.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive disk load information to be transformed, transform the disk load information, output a result of the transformation to a disk management system, use the result of the transformation to transfer loads between disks, and store the result of the transformation to a log. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for dynamic load balancing on disks, at least a portion of the method being performed by a computing device comprising at least one processor, the method comprising:

calculating, for each disk in a plurality of disks, a spare throughput by calculating a difference between a maximum throughput of the disk and a throughput currently consumed at least in part by workloads from one or more client systems;

identifying a lightly loaded disk with a highest spare throughput among the plurality of disks and a heavily loaded disk with a lowest spare throughput among the plurality of disks;

identifying a set of workloads to be transferred from the heavily loaded disk to the lightly loaded disk by:
  beginning with the set of workloads to be transferred empty;
  identifying a set of candidate workloads initiated by the client systems on the heavily loaded disk;
  adding a new workload from the set of candidate workloads to the set of workloads to be transferred when the new workload would not reduce the spare throughput on the lightly loaded disk below a predetermined threshold for spare throughput on transfer recipients if both the set of workloads to be transferred and the new workload were transferred to the lightly loaded disk, where the predetermined threshold is calculated based on an average spare throughput for the plurality of disks;
  considering each workload in the set of candidate workloads for inclusion into the set of workloads to be transferred in order from most throughput consumed to least throughput consumed;

transferring the set of workloads to be transferred from the heavily loaded disk to the lightly loaded disk.

2. The computer-implemented method of claim 1, wherein calculating, for each disk in the plurality of disks, the spare throughput comprises determining that the average spare throughput for the plurality of disks is not decreasing and a workload transfer is therefore to be initiated.

3. The computer-implemented method of claim 1, wherein identifying the lightly loaded disk comprises determining that a difference between the average spare throughput and the spare throughput on the lightly loaded disk surpasses a predetermined threshold for imbalanced disk throughput and a workload transfer is therefore to be initiated.

4. The computer-implemented method of claim 1, wherein identifying the heavily loaded disk comprises determining that the spare throughput on the heavily loaded disk is below a predefined threshold for minimum spare throughput on heavily loaded disks and a workload transfer is therefore to be initiated.

5. The computer-implemented method of claim 1, wherein the predetermined threshold comprises the average spare throughput across the plurality of disks.

6. The computer-implemented method of claim 1, wherein calculating the difference between the maximum throughput of the disk and the throughput currently consumed comprises calculating the throughput currently consumed based on a percentage of time the disk is active rather than idle.

7. The computer-implemented method of claim 1, wherein transferring the set of workloads from the heavily loaded disk to the lightly loaded disk comprises initiating the transfer of the set of workloads after identifying the entirety of the set of workloads to be transferred.

8. The computer-implemented method of claim 1, further comprising:
identifying a new heavily loaded disk with a new lowest spare throughput among the plurality of disks after the set of workloads has been transferred from the heavily loaded disk;
identifying a set of workloads to be transferred from the new heavily loaded disk to the lightly loaded disk;
transferring the set of workloads from the new heavily loaded disk to the lightly loaded disk;
continuing to identify new heavily loaded disks with new lowest spare throughputs and transfer workloads from the new heavily loaded disks to the lightly loaded disk until the spare throughput for the lightly loaded disk would drop below the predetermined threshold for spare throughput if an additional workload were transferred to the lightly loaded disk.

9. The computer-implemented method of claim 1, wherein considering each workload in the set of candidate workloads comprises ceasing considering workloads once the set of workloads to be transferred would put the spare throughput of the lightly loaded disk within a predetermined tolerance of the predetermined threshold for spare throughput.

10. A system for dynamic load balancing on disks, the system comprising:
a calculation module, stored in memory, that calculates, for each disk in a plurality of disks, a spare throughput by calculating a difference between a maximum throughput of the disk and a throughput currently consumed at least in part by workloads from one or more client systems;
a disk identification module, stored in memory, that identifies a lightly loaded disk with a highest spare throughput among the plurality of disks and a heavily loaded disk with a lowest spare throughput among the plurality of disks;
a workload identification module, stored in memory, that identifies a set of workloads to be transferred from the heavily loaded disk to the lightly loaded disk by:
beginning with the set of workloads to be transferred empty;
identifying a set of candidate workloads initiated by the client systems on the heavily loaded disk;
adding a new workload from the set of candidate workloads to the set of workloads to be transferred when the new workload would not reduce the spare throughput on the lightly loaded disk below a predetermined threshold for spare throughput on transfer recipients if both the set of workloads to be transferred and the new workload were transferred to the lightly loaded disk, wherein the predetermined threshold is calculated based on an average spare throughput for the plurality of disks;
considering each workload in the set of candidate workloads for inclusion into the set of workloads to be transferred in order from most throughput consumed to least throughput consumed;
a transfer module, stored in memory, that transfers the set of workloads to be transferred from the heavily loaded disk to the lightly loaded disk;
at least one physical processor configured to execute the calculation module, the disk identification module, the workload identification module, and the transfer module.

11. The system of claim 10, wherein the calculation module calculates, for each disk in the plurality of disks, the spare throughput by determining that the average spare throughput for the plurality of disks is not decreasing and a workload transfer is therefore to be initiated.

12. The system of claim 10, wherein the disk identification module identifies the lightly loaded disk by determining that a difference between the average spare throughput and the spare throughput on the lightly loaded disk surpasses a predetermined threshold for imbalanced disk throughput and a workload transfer is therefore to be initiated.

13. The system of claim 10, wherein the disk identification module identifies the heavily loaded disk by determining that the spare throughput on the heavily loaded disk is below a predefined threshold for minimum spare throughput on heavily loaded disks and a workload transfer is therefore to be initiated.

14. The system of claim 10, wherein the predetermined threshold comprises the average spare throughput across the plurality of disks.

15. The system of claim 10, wherein the calculation module calculates the difference between the maximum throughput of the disk and the throughput currently consumed by calculating the throughput currently consumed based on a percentage of time the disk is active rather than idle.

16. The system of claim 10, wherein the transfer module transfers the set of workloads from the heavily loaded disk to the lightly loaded disk by initiating the transfer of the set of workloads after identifying the entirety of the set of workloads to be transferred.

17. The system of claim 10, wherein:
the disk identification module identifies a new heavily loaded disk with a new lowest spare throughput among the plurality of disks after the set of workloads has been transferred from the heavily loaded disk;
the workload identification module identifies a set of workloads to be transferred from the new heavily loaded disk to the lightly loaded disk;

the transfer module transfers the set of workloads from the new heavily loaded disk to the lightly loaded disk;

the identification module continues to identify new heavily loaded disks with new lowest spare throughputs and the transfer module continues to transfer workloads from the new heavily loaded disks to the lightly loaded disk until the spare throughput for the lightly loaded disk would drop below the predetermined threshold for spare throughput if an additional workload were transferred to the lightly loaded disk.

18. The system of claim 10, wherein the workload identification module considers each workload in the set of candidate workloads by ceasing considering workloads once the set of workloads to be transferred would put the spare throughput of the lightly loaded disk within a predetermined tolerance of the predetermined threshold for spare throughput.

19. A non-transitory computer-readable medium comprising one or more computer-readable instructions that, when executed by at least one processor of a computing device, cause the computing device to:

calculate, for each disk in a plurality of disks, a spare throughput by calculating a difference between a maximum throughput of the disk and a throughput currently consumed at least in part by workloads from one or more client systems;

identify a lightly loaded disk with a highest spare throughput among the plurality of disks and a heavily loaded disk with a lowest spare throughput among the plurality of disks;

identify a set of workloads to be transferred from the heavily loaded disk to the lightly loaded disk by:

beginning with the set of workloads to be transferred empty;

identifying a set of candidate workloads initiated by the client systems on the heavily loaded disk;

adding a new workload from the set of candidate workloads to the set of workloads to be transferred when the new workload would not reduce the spare throughput on the lightly loaded disk below a predetermined threshold for spare throughput on transfer recipients if both the set of workloads to be transferred and the new workload were transferred to the lightly loaded disk, wherein the predetermined threshold is calculated based on an average spare throughput for the plurality of disks;

considering each workload in the set of candidate workloads for inclusion into the set of workloads to be transferred in order from most throughput consumed to least throughput consumed;

transfer the set of workloads to be transferred from the heavily loaded disk to the lightly loaded disk.

20. The non-transitory computer-readable medium of claim 19, wherein the one or more computer-readable instructions cause the computing device to calculate, for each disk in the plurality of disks, the spare throughput by determining that the average spare throughput for the plurality of disks is not decreasing and a workload transfer is therefore to be initiated.

* * * * *